(12) United States Patent
Yang

(10) Patent No.: US 11,072,057 B2
(45) Date of Patent: Jul. 27, 2021

(54) BEARING REMOVAL TOOL

(71) Applicant: Jen-Yung Yang, Taichung (TW)

(72) Inventor: Jen-Yung Yang, Taichung (TW)

(*) Notice: Subject to any disclaimer, the term of this patent is extended or adjusted under 35 U.S.C. 154(b) by 42 days.

(21) Appl. No.: 16/783,103

(22) Filed: Feb. 5, 2020

(65) Prior Publication Data
US 2021/0138619 A1    May 13, 2021

(30) Foreign Application Priority Data
Nov. 11, 2019 (TW) ................. 108140887

(51) Int. Cl.
*B25B 27/06* (2006.01)
*F16C 43/04* (2006.01)

(52) U.S. Cl.
CPC ............. *B25B 27/06* (2013.01); *F16C 43/04* (2013.01)

(58) Field of Classification Search
CPC ........ B23P 19/025; F16C 33/14; F16C 33/64; F16C 43/02; F16C 43/04; F16C 226/12; B25B 27/06; B25B 27/02
See application file for complete search history.

(56) References Cited

U.S. PATENT DOCUMENTS

| 2,924,005 A * | 2/1960 | Wilson .................. B25B 27/026 29/262 |
| 2016/0263733 A1 * | 9/2016 | Marquis .................. B25B 31/00 |

* cited by examiner

*Primary Examiner* — Christopher J Besler
(74) *Attorney, Agent, or Firm* — Guice Patents PLLC

(57) ABSTRACT

A bearing removal tool includes a plurality of hook arms and a connecting disk. Each hook arm has a connecting space for engaging with a peripheral portion of the connecting disk, and there are specific dimensional relationships between the connecting spaces and the connecting disk such that, once the connecting disk is fitted into the connecting spaces of the hook arms, the user only has to move the hook arms laterally for a predetermined distance in order for the hook arms to be restricted by the connecting disk and prevented from separating from the connecting disk. The bearing removal tool, therefore, can be put together more easily and more rapidly than its prior art counterparts.

9 Claims, 5 Drawing Sheets

BEARING REMOVAL TOOL

BACKGROUND OF THE INVENTION

1. Technical Field

The present invention relates to a tool and more particularly to a structurally improved bearing removal tool.

2. Description of Related Art

It has become common practice to remove a bearing with a bearing puller or similar bearing removal tools. As bearings vary greatly in size and configuration, a bearing removal tool whose size and configuration match those of the bearing to be removed is essential to the ease and success of the bearing removal operation. In order for a single bearing removal tool to be applicable to bearings of different sizes, there have been tool kits that include differently sized hook arms to be hooked to different bearings respectively. More specifically, proper hook arms can be selected according to the bearing to be removed, and then connected to a driving member in a detachable manner so that the assembly can be driven through the driving member when used to remove the bearing.

While the prior art has provided the technical means for connecting the selected hook arms to the driving member with ease, the technical contents of the means still leave something to be desired. For example, the selected hook arms may have problem being properly positioned with respect to, or securely connected to, the driving member.

BRIEF SUMMARY OF THE INVENTION

The primary objective of the present invention is to provide a structurally improved bearing removal tool that can be easily assembled to facilitate bearing removal.

To achieve the above objective, the present invention provides a bearing removal tool that includes a plurality of hook arms and a connecting disk. Each hook arm has a connecting space for engaging with a peripheral portion of the connecting disk, and there are specific dimensional relationships between the connecting spaces and the connecting disk such that, once the connecting disk is fitted into the connecting spaces of the hook arms, the user only has to move the hook arms laterally for a predetermined distance in order for the hook arms to be restricted by, and prevented from separating from, the connecting disk. The bearing removal tool, therefore, can be put together more easily and more rapidly than its prior art counterparts.

To establish the specific dimensional relationships mentioned above, the connecting disk has: a disk body portion that has a first predetermined thickness; a disk periphery portion that is located at and extends along the periphery of the disk body portion and has a rounded shape and a second predetermined thickness; and an entrance portion that is located at a predetermined position on the periphery of the disk body portion, is adjacent to the disk periphery portion, and has a third predetermined thickness, wherein the second predetermined thickness is greater than the first predetermined thickness and the third predetermined thickness. In addition, each of the hook arms has: a slender arm body; a connecting space that is located in a first longitudinal-axis end portion of the arm body, has a predetermined inner diameter, and is open at two opposite ends; and an opening that extends from an inner wall portion of the first longitudinal-axis end portion of the arm body to an outer wall portion of the arm body and has a predetermined opening size, wherein the inner wall portion corresponds to one side of the connecting space. The predetermined opening size is smaller than the second predetermined thickness but greater than the first predetermined thickness. The predetermined inner diameter is equal to or greater than the second predetermined thickness.

The opening of each hook arm can be engaged with the connecting disk, or more particularly with the entrance portion of the connecting disk to begin with, such that the connecting spaces correspond to the entrance portion. The hook arms can then be transversely displaced to render the disk periphery portion mounted in the connecting spaces, with the relatively small openings of the hook arms limited by the disk periphery portion and kept from separating from the connecting disk via the disk periphery portion. As a result, the hook arms are hooked to the connecting disk without the likelihood of getting loose, and the foregoing objective of the present invention is thus achieved.

To enable engagement between the hook arms and the bearing to be removed, each hook arm further includes: a claw that corresponds to a second longitudinal-axis end portion of the arm body, and a pivotal connection portion that is provided between one end of the claw and the second longitudinal-axis end portion of the arm body to pivotally connect the claw and the second longitudinal-axis end portion of the arm body. The claws of the hook arms can be placed into and engaged with the bearing to be removed, thereby connecting the hook arms to the bearing.

To facilitate the engagement between the claws and the bearing to be removed, the pivotal connection portion of each hook arm further includes a spring for providing an elastic force so that the claws not only can be positioned in an elastic manner during use, but also can be restored in place by the elastic force of the springs after use.

In order for the same hook arms to be adaptable to bearings of different sizes, each hook arm further includes a plurality of pads that are stacked on the arm body of the hook arm. A selected one or combination of the pads that has a specific (total) thickness can be used as needed to fill the gap between the arm body of each hook arm and the inner ring of the bearing to be removed, ensuring that the bearing removal tool is tightly connected to, and can therefore effectively pull out, the bearing.

DETAILED DESCRIPTION OF THE INVENTION

Figure 1:
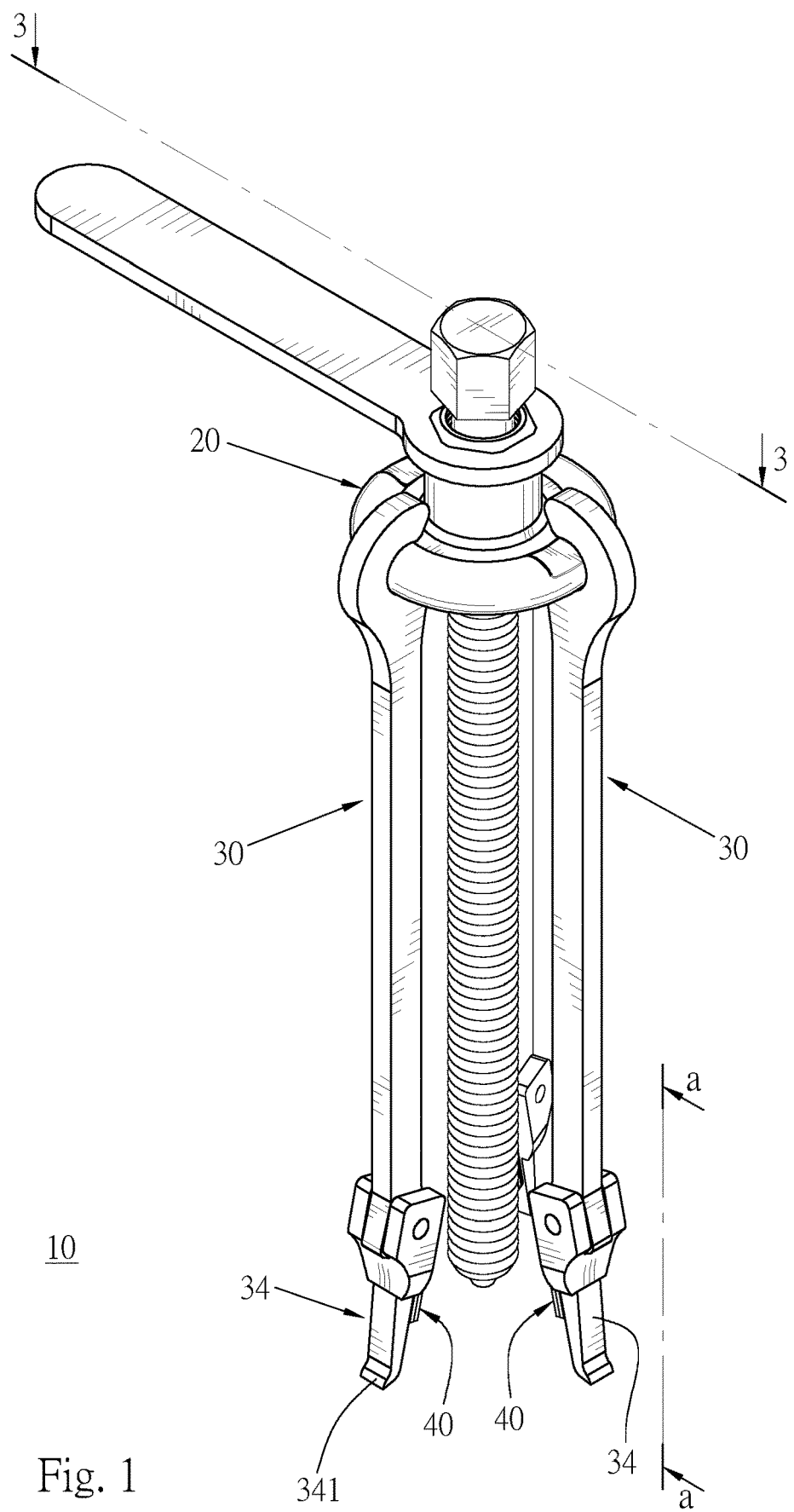
FIG. 1 is a perspective view of a preferred embodiment of the present invention.
Figure 2:
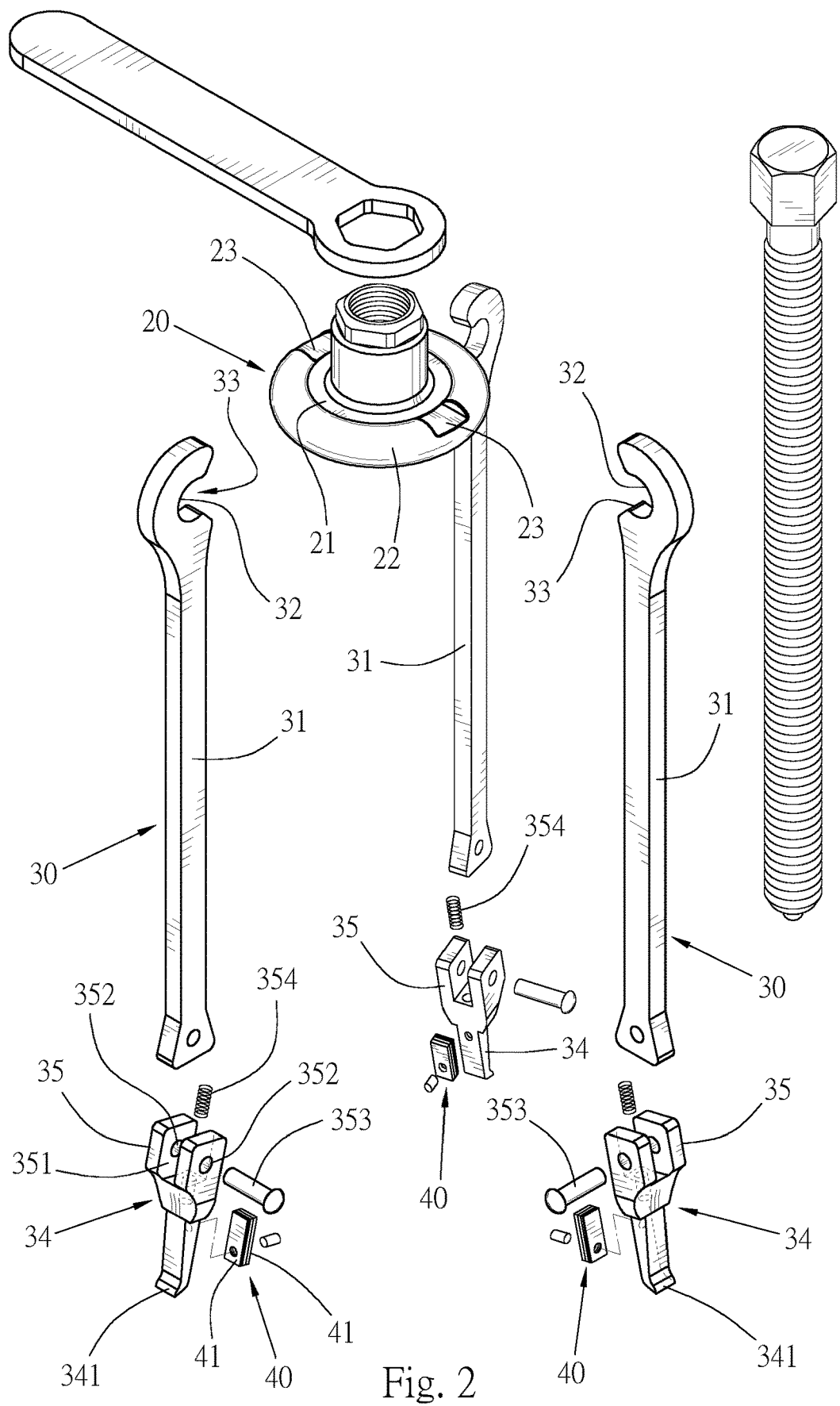
FIG. 2 is an exploded view of the preferred embodiment in FIG. 1.

Referring to FIG. 1 and FIG. 2, a structurally improved bearing removal tool 10 according to a preferred embodiment of the present invention essentially includes a connecting disk 20, a plurality of hook arms 30, and a plurality of pad sets 40.

Figure 3:
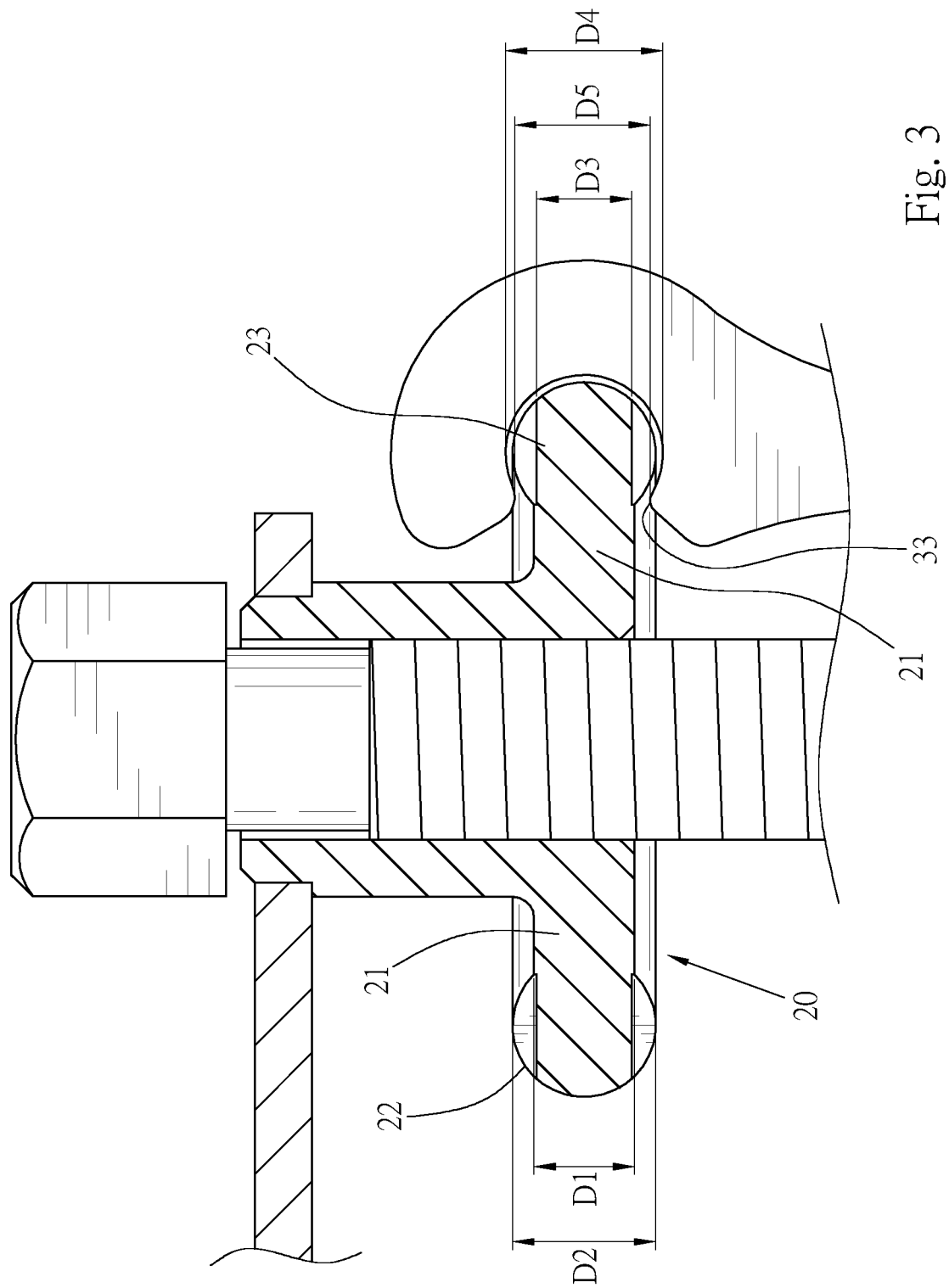
FIG. 3 is a sectional view taken along line 3-3 in FIG. 1.
Figure 4:
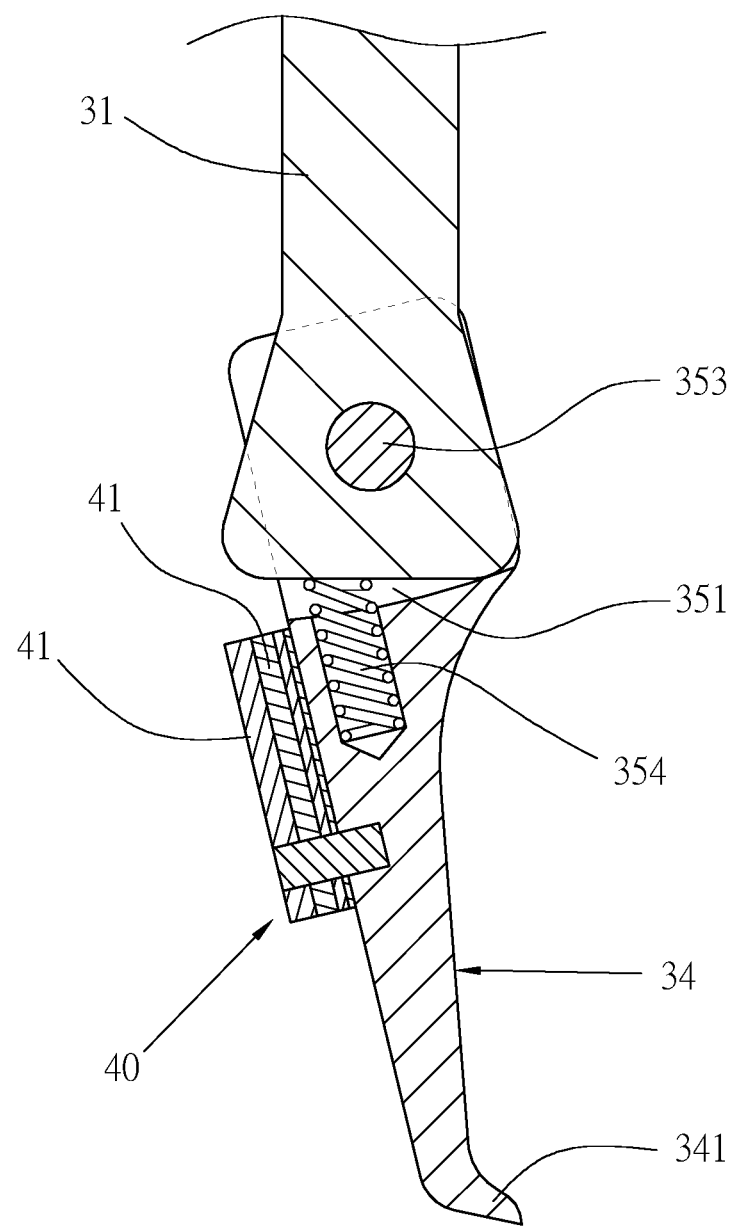
FIG. 4 is a sectional view taken along line a-a in FIG. 1, showing the claw in a first position.

Referring also to FIG. 3 and FIG. 4, the connecting disk 20 is an integrally formed object with the following structures: a disk body portion 21 in the shape of a circular plate; a plurality of disk periphery portions 22 that are sequentially arranged at intervals, and in a coaxial manner, along the periphery of the disk body portion 21, extend for the same length, and are of a rounded shape; and a plurality of entrance portions 23 that are located at the periphery of the disk body portion 21 and alternate with, and are adjacent to, the disk periphery portions 22. The disk body portion 21 has a first predetermined thickness D1, each disk periphery portion 22 has a second predetermined thickness D2, and each entrance portion 23 has a third predetermined thickness D3. The first predetermined thickness D1 is slightly greater than the third predetermined thickness D3 but smaller than the second predetermined thickness D2.

Each hook arm 30 has: a slender arm body 31; a connecting space 32 that is formed as a hole, penetrates a first longitudinal-axis end portion of the arm body 31, and opens on two lateral sides of the arm body 31; an opening 33 that extends from an inner wall portion of the first longitudinal-axis end portion of the arm body 31 to an outer wall portion of the arm body 31, wherein the inner wall portion corresponds to one side of the connecting space 32, and wherein the opening 33 is in communication with the connecting space 32 in a radial direction of the connecting space 32; a slender claw 34 with a longitudinal end corresponding to a second longitudinal-axis end portion of the arm body 31; and a pivotal connection portion 35 provided between the aforesaid end of the claw 34 and the second longitudinal-axis end portion of the arm body 31 to pivotally connect the claw 34 to the second longitudinal-axis end portion of the arm body 31. The connecting space 32 has an inner diameter D4 greater than the second predetermined thickness D2. The opening 33 has an opening size D5 smaller than the second predetermined thickness D2 but equal to or greater than the third predetermined thickness D3.

Figure 5:
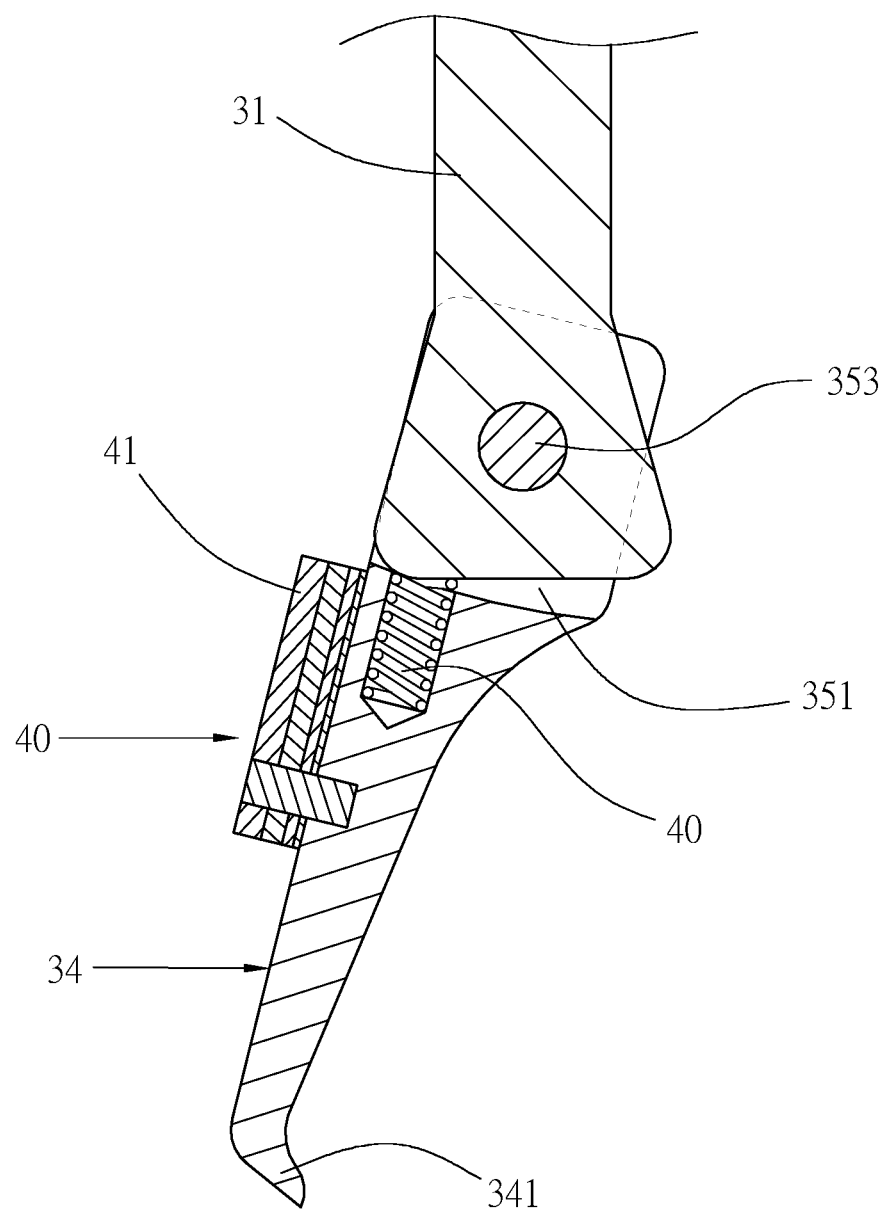
FIG. 5 is another sectional view taken along line a-a in FIG. 1, showing the claw in a second position.

The pivotal connection portion 35 has: an engaging groove 351 concavely provided in the aforesaid longitudinal end of the claw 34 and configured to engage with the second longitudinal-axis end portion of the arm body 31; a pivot hole 352 penetrating the two lateral walls of the engaging groove 351 and extending through the portion of the arm body 31 that is inserted in the engaging groove 351; a pivot shaft 353 extending through the pivot hole 352 so that the aforesaid end of the claw 34 can be pivoted about an axis defined by the shank of the pivot shaft 353; a spring 354 partially buried in a portion of the claw 34 that corresponds to the bottom wall of the engaging groove 351, with the exposed end of the spring 354 extending into the engaging groove 351 and pressing against one end of the arm body 31, thereby providing an elastic force that not only keeps the claw 34 in a first position with respect to the pivot shaft 353 while the bearing removal tool 10 is not in use, as shown in FIG. 4, but also allows the claw 34 to be rotated about the pivot shaft 353 to a second position (and compress the spring 354 at the same time) when the claw 34 is subjected to an external force, as shown in FIG. 5. To form the dead points of the back-and-forth movement of the claw 34 between the first position and the second position, the bottom wall of the engaging groove 351 may be planar and parallel to the hole axis of the pivot hole 352 while the second longitudinal-axis end portion of the arm body 31 (which end portion is inserted in the engaging groove 351) has a tapered shape and is gradually increased in thickness toward the distal end so that, when the claw 34 is rotated about the pivot shaft 353, interference between the bottom wall of the engaging groove 351 and the tapered distal end of the arm body 31 creates the dead points of the back-and-forth pivotal movement of the claw 34.

Each pad set 40 is pivotally provided on one of the claws 34, or more particularly on the side of the claw 34 that faces the second position of the claw 34 (i.e., on the opposite side of the claw end 341 of the claw 34, wherein the claw end 341 points to the first position of the claw 34). Each pad set 40 includes a plurality of pads 41 that are stacked together. A selected one or selected ones of the pads 41 can be used as needed to fill the gap between each claw 34 and the inner ring of the bearing to be removed.

To apply the structurally improved bearing removal tool 10 to a bearing removal operation, the size, configuration, and number of the hook arms 30 to be used should be selected according to the size and configuration of the bearing to be removed. The claw ends 341 of the selected hook arms 30 are then inserted in between the balls of the bearing, and each pad set 40 can be adjusted as needed in order for the hook arms 30 to be inserted securely in the bearing. After that, the entrance portions 23 of the connecting disk 20 are inserted into the openings 33 of the hook arms 30 respectively, and the connecting disk 20 is subsequently rotated through a certain angle until the disk periphery portions 22 are respectively engaged in the connecting spaces 32 to restrict the hook arms 30 to the connecting disk 20. The bearing removal tool 10 can now be driven through a conventional driving member (such as a bolt) in order to pull out the bearing. It should be pointed out that the driving means is not a characterizing feature of the present invention and therefore will not be described in more detail. Moreover, the technical contents disclosed herein serve only to expound the essential technical features of the invention and are not intended to be restrictive of the scope of the invention. The scope of patent protection sought by the applicant is defined by the appended claims.

What is claimed is:

1. A bearing removal tool, comprising:
   a connecting disk having a disk body portion, a disk periphery portion, and an entrance portion, wherein the disk body portion has a first predetermined thickness, the disk periphery portion is boated at and extends along a periphery of the disk body portion and has a rounded shape and a second predetermined thickness, and the entrance portion is boated at a predetermined position on the periphery of the disk body portion, is adjacent to the disk periphery portion, and has a third predetermined thickness, wherein the second predetermined thickness is greater than the first predetermined thickness and the third predetermined thickness; and
   a plurality of hook arms each having a slender arm body, a connecting space, and an opening, wherein in each said hook arm, the connecting space is provided in a first longitudinal-axis end portion of the arm body, has a predetermined inner diameter, and is open at two opposite ends, the opening extends from an inner wall portion of the first longitudinal-axis end portion of the arm body to an outer wall portion of the arm body and has a predetermined opening size, the inner wall portion corresponds to one side of the connecting space, the predetermined opening size is smaller than the second predetermined thickness but greater than the first predetermined thickness, and the predetermined inner diameter is equal to or greater than the second predetermined thickness;
   wherein each said hook arm further comprise a claw and a pivotal connection portion; and in each said hook arm, the claw corresponds to a second longitudinal-axis end portion of the arm body, and the pivotal connection portion is provided between an end of the claw and the second longitudinal-axis end portion of the arm body to pivotally connect the claw and the second longitudinal-axis end portion of the arm body;

wherein each of the connecting spaces are engages with the disk periphery portion, so as to connect the plurality of hood arms to the connecting disk.

2. The bearing removal tool of claim 1, wherein in each said hook arm, the pivotal connection portion has an engaging groove, a pivot hole, and a pivot shaft, the engaging groove is concavely provided in the end of the claw and is engaged with the second longitudinal-axis end portion of the arm body, the pivot hole penetrates the second longitudinal-axis end portion of the arm body and the claw and has a hole axis extending through the engaging groove, and the pivot shaft extends through the pivot hole to connect the claw and the arm body.

3. The bearing removal tool of claim 2, wherein in each said hook arm, the pivotal connection portion further comprises a spring, the spring is partially buried in a portion of the claw that corresponds to a bottom side of the engaging groove, and the spring presses elastically against a distal end of the second longitudinal-axis end portion of the arm body.

4. The bearing removal tool of claim 3, wherein in each said hook arm, the engaging groove of the pivotal connection portion has a planar bottom wall parallel to the hole axis of the pivotal hole.

5. The bearing removal tool of claim 4, wherein in each said hook arm, the second longitudinal-axis end portion of the arm body has a tapered shape and is gradually increased in thickness toward the distal end of the second longitudinal-axis end portion.

6. The bearing removal tool of claim 1, wherein each said hook arm further comprises a pad set, and in each said hook arm, the pad set is pivotally connected to a side of the claw.

7. The bearing removal tool of claim 6, wherein each said pad set comprises a plurality of pads that vary in thickness and are stacked together.

8. The bearing removal tool of claim 1, wherein the disk body portion is shaped as a circular plate.

9. The bearing removal tool of claim 8, wherein the rounded shape of the disk periphery portion is defined by a circular arc.

* * * * *